Sept. 14, 1965 R. F. CROOK 3,206,216
FLUID PRESSURE SEAL ASSEMBLAGE
Filed May 23, 1962

INVENTOR
Richard F. Crook
BY
AGENT

United States Patent Office 3,206,216
Patented Sept. 14, 1965

3,206,216
FLUID PRESSURE SEAL ASSEMBLAGE
Richard F. Crook, East Haven, Conn., assignor to Westinghouse Electric Corporation, East Pittsburgh, Pa., a corporation of Pennsylvania
Filed May 23, 1962, Ser. No. 197,146
5 Claims. (Cl. 277—23)

The present invention relates to a fluid pressure seal assemblage, and more particularly to a fluid pressure O-ring face seal assemblage.

In the use of an O-ring to prevent leakage of fluid under pressure outwardly between abutting faces at a fluid pressure joint, where, for example, such O-ring acts to retain an element such as a flat disc filter or orifice member, for example, the outer periphery of the O-ring is relied upon to prevent escape of that fluid under pressure which can leak past the back face of such element. In the event of O-ring shrinkage or marginal dimensional conditions, which may be caused by various factors, the peripheral seal at the O-ring is destroyed and leakage then occurs at the face joint.

Under conditions where no such element is retained by the O-ring and opposite sides of the O-ring are relied upon for sealing, shrinkage of the O-ring can occur past one or both of such sides.

In view of the foregoing remarks, it is an object of the present invention to provide an O-ring face seal assemblage which will function without leakage under conditions conducive to O-ring shrinkage.

It is a further object of the present invention to provide an O-ring face seal assemblage which may be employed in conjunction with retention of a disc-shaped element without leakage for a prolonged period of time, substantially longer than heretofore possible with this type of seal under certain similar working conditions of temperature and pressures.

Another object of the present invention is the provision of an improved O-ring face seal assemblage of the foregoing type which facilitates modification of previously existing O-ring face seal assemblages.

In accord with the basic general features of the present invention, the face seal assemblage ring element comprises a rigid annular ring element constructed and arranged in cooperation with the abutting face joint members to maintain the peripheral sealing contact of the O-ring regardless of any tendency for O-ring shrinkage.

Figure 5:
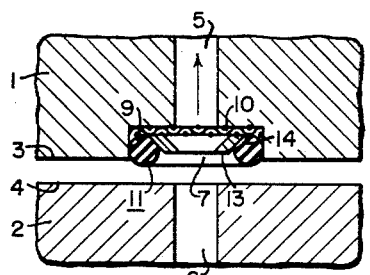
Figure 6:
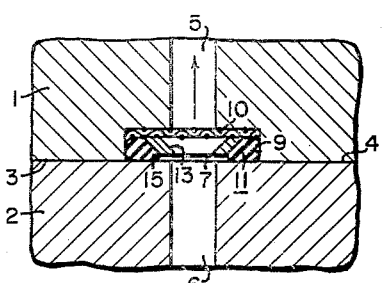
Figure 7:
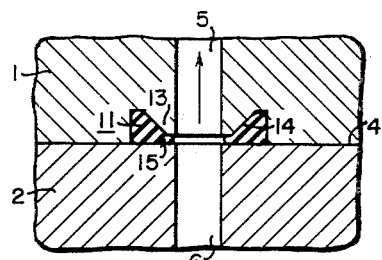

Other objects and advantages of the invention will become apparent from the following detailed description when taken in connection with the accompanying drawings, in which:

FIGURES 1, 2 3 and 4 show schematically, in cross-section, typical prior art face seal assemblages before and after, respectively, O-ring joint leakage;

FIGS. 5 and 6 show schematically, in cross-section, one embodiment of the face seal assemblage of the present invention immediately prior to and after, respectively, the final assembling; and FIG. 7 shows an alternate embodiment of a face seal assemblage of this invention.

Figure 1:
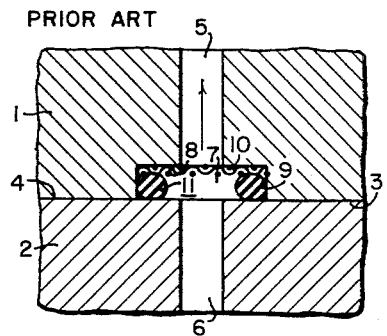

Referring to FIG. 1, a prior art face seal assemblage of which the present invention constitutes an improvement comprises separable casing members 1 and 2 having respective mating faces 3 and 4 for abutting contact one with the other when such members are secured together by means (not shown) to obtain fluid pressure communication between aligned conduits 5 and 6 formed in such members 1 and 2, respectively.

Members 1 and 2 may constitute portions of such as a divided servo valve casing or of a fluid coupling, for example, through the registering conduits 5 and 6 of which passes hydraulic fluid under pressure which it is desired to prevent from escaping via the joint at faces 3 and 4 and which it is desired to filter at such joint for purposes of protecting such as critical valve components from foul-up by foreign particles. To this end, the member 1 is provided with an annular recess 7 coaxial with the conduit 5 and defined by an annular shoulder 8 extending radially outward from said conduit 5, and a cylindrical wall 9 extending axial-wise from the outer periphery of shoulder 8 into intersection with the face 3. Shoulder 8 serves to locate a disc-shaped porous filter element 10 which is retained in place by a resilient O-ring 11 clamped between such filter element and the face 4 of the member 2 when the latter is joined to the member 1.

During the flow of fluid under pressure from conduit 6 to conduit 5, for example, the filter element 10 will remove any foreign particles which may be present, while the O-ring 11 when initially installed as shown in FIG. 1 prevents leakage of fluid under pressure outwardly between faces 3 and 4 by contact with the face 4 of casing member 2 and with the cylindrical surface 9 at its outer periphery.

Figure 2:
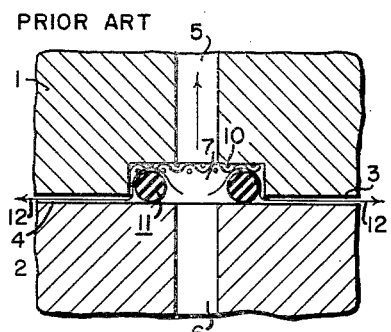

It has been found, however, that the resilient O-ring 11 even when made of synthetic rubber or elastomeric compound formulated for zero shrinkage and employed in the FIGS. 1 and 2 configuration in accord with standard dimensions for recommended degree of compression, etc., may exhibit leakage past its outer periphery when subjected periodically to hydraulic fluid at cyclical pressures up to 1000 p.s.i. and varying temperatures from —65° F. storage temperatures to +225° F. operating temperature, for example. Such leakage when occurring in the exemplified prior art configuration occurs along a path 12 through the filter element 10, past the outer periphery of said O-ring and outwardly at the joint between faces 3 and 4, as shown in FIG. 2, as a result of O-ring deformation or shrinkage occurring under the particular working conditions.

Figure 3:
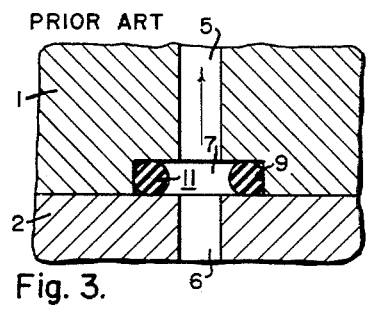
Figure 4:
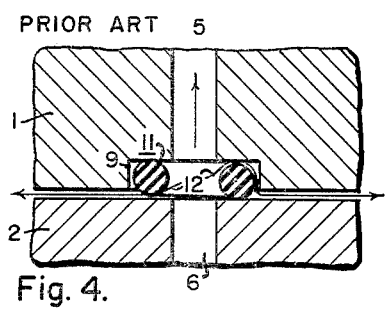

Such leakage also may occur due to O-ring shrinkage in such as the prior art configuration shown in FIGS. 3 and 4, even where no such element 10 is included. As shown in FIG. 4 the leakage paths may occur as in FIG. 2, as well as past one face of the O-ring.

Referring to FIGS. 5, 6 and 7, in accord with the present invention there is incorporated in the assemblage of FIGS. 1 and 2 a rigid, seal-assuring element 13. Element 13 fits inside the O-ring 11 to maintain sealing contact of one face and the outer periphery of said O-ring with face 4 of casing member 2 and the cylindrical wall 9 of the recess 7 in casing member 1 in the presence of the factors which tend to cause deformation and/or shrinkage of the O-ring in the assemblages of FIGS. 1, 2, 3 and 4 as discussed hereinbefore.

Referring to FIGS. 5, 6 and 7, the rigid annular element 13 is tapered at least at its outer periphery, i.e. it has a larger outer diameter at its one axial end than at its opposite axial end. The outer peripheral dimensions of the element 13 relative to the size of the O-ring 11 and the dimensions of the recess 7 are such that a wedging action is imparted to the O-ring when members 1 and 2 are secured together. Such wedging action causes the O-ring 11 to be squeezed between the face 4 of member 2, an annular surface of element 10, and the tapered annular outer surface 14 of element 13, which in turn also urges such O-ring tightly against the cylindrical surface 9 of recess 7, as shown in FIG. 4.

In accord with the illustrative embodiment, as shown in

FIGURE 5 the element 13 and the O-ring 11 are proportioned such that, with the disc-shaped filter element 10 in place in the recess 7, with the larger end of element 13 abutting said filter element, with the O-ring nested in surround of element 13, and with the members 1 and 2 separated; the O-ring will be contacting the cylindrical wall 9 of recess 7 and will be projecting outwardly of recess 7 beyond the plane of the mounting face 4 of element 1 sufficiently to afford the opportunity for effecting the necessary wedging or squeezing action to the O-ring by contact with the mounting face 4 when the two members 1 and 2 are clamped together as shown in FIG. 6.

In accord with the illustrative showing in FIGS. 6 and 7, the axial dimension of element 13 is made less than the effective depth within recess 7 to provide radial space into which the inner portion 15 of the O-ring is displaced as a result of the wedging or squeezing action imparted during the final assembling when members 1 and 2 are clamped together. Such displacement-affording space may be provided for in another manner, as by suitable contouring of the outer surface of element 13, but in any event its thickness in an axial direction should not be so great as to interfere with the joining of members 1 and 2. A taper of 45° on the outer surface of element 13 has been found suitable.

In testing for a period of over 500 hours, face seal assemblages of the FIGS. 5 and 6 form have performed without leakage when subjected to internal hydraulic cycling pressures from 300 p.s.i to 1000 p.s.i. at the rate of one cycle per second during temperature variations from −65° F. to 225° F.

The tapered configuration of the outer surface of element 13 enables an effective squeezing of the O-ring to be effected both radially and axially during clamping of the members 1 and 2, within the usual tolerance dimensions of the O-ring, and with readily-obtained tolerance dimensions of the recess 7 and element 13.

In the FIG. 7 form, the element 13 is formed integrally with the casing member 1 and in the FIGS. 5 and 6 showings, element 13 is removable. In its removable form element 13 may also be used without inclusion of such as filter element 10 by appropriate dimensional changes.

From the foregoing, it will be apparent that a face seal assemblage employing the tapered seal-assuring element 13 within the O-ring 11 may readily be provided initially during the manufacture and assembling of a device or of a fitting employing same, or such assemblage may be provided subsequently as a modification of the FIGS. 1, 2, 3 and 4 form of seal assemblage should operating requirements of such device or of such fitting demonstrate a need for incorporation of such element in its separated form.

While there has been shown and described what is at present considered to be the preferred embodiment of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim:

1. A face seal assemblage comprising separable casing members having respective face portions in abutting contact one with the other and having respective conduits therein extending from said face portions for fluid pressure communication therebetween, one casing member having a recess defined by a cylindrical surface extending from the respective face of said one casing member encircling an end of the respective conduit in said one member; a fluid-flow-permissive element removably disposed in said recess; a ring member disposed in said recess in unconnected relationship with the casing members, said ring member having an outer surface tapering with decreasing diameter in the direction of the aforesaid abutting face portions; and an O-ring sealing member disposed in said recess in a squeezed condition between the aforesiad cylindrical surface, the outer tapered surface of said ring member, the face portion of the other casing member, and a surface of said circular element.

2. A face seal assemblage comprising separable casing members having respective face portions in abutting contact one with the other and having respective conduits therein extending from said face portions for fluid pressure communication therebetween, one casing member having a recess defined by a cylindrical surface extending from the respective face of said one casing member and an intersecting annular shoulder encircling an end of the respective conduit in said one member; a fluid-flow-permissive disc-shaped element removably disposed in said recess in contact with the aforesaid annular shoulder, an unconnected removable ring member disposed in said recess in contact with said disc-shaped element said ring member having an outer surface tapering with decreasing diameter in the direction of the aforesaid abutting face portions, and an O-ring sealing member disposed in said recess in a squeezed condition between the aforesaid cylindrical surface, the outer tapered surface of said ring member, and the face portion of the other casing member.

3. A face seal assemblage comprising separable casing members having respective face portions in abutting contact one with the other and having respective conduits therein extending from said face portions for fluid pressure communication therebetween, one casing member having a recess defined by a cylindrical surface extending from the respective face of said one casing member and an intersecting annular shoulder encircling an end of the respective conduit in said one member, a disc-shaped filter element removably disposed in said recess in contact with the aforesaid annular shoulder, an unconnected removable ring member disposed in said recess in contact with said disc-shaped element, said ring member having an outer surface tapering with decreasing diameter in the direction of the aforesaid abutting face portions, and an O-ring sealing member disposed in said recess in a squeezed condition between the aforesaid cylindrical surface, the outer tapered surface of said ring member, the face portion of the other casing member, and an annular surface of said filter element.

4. A face seal assemblage comprising separable casing members having respective face portions in abutting contact one with the other and having respective conduits therein extending from said face portions for fluid pressure communication therebetween, one casing member having a recess defined by a cylindrical surface extending from the respective face of said one casing member and an intersecting annular shoulder encircling an end of the respective conduit in said one member; a fluid-flow-permissive disc-shaped element removably disposed in said recess in contact with the aforesaid annular shoulder; an unconnected removable ring member disposed in said recess in contact with said disc-shaped element, said ring member having an outer surface tapering with decreasing diameter in the direction of the aforesaid abutting face portions and being of lesser axial thickness than the depth of said recess from such face portions to said disc-shaped element; and an O-ring sealing member disposed in said recess in a squeezed condition between the aforesaid cylindrical surface, the outer tapered surface of said ring member, and the face portion of the other casing member.

5. A face seal assemblage comprising separable casing members having respective face portions in abutting contact one with the other and having respective conduits therein extending from said face portions for fluid pressure communication therebetween, one casing member having a recess defined by a cylindrical surface extending from the respective face of said one casing member and an intersecting annular shoulder encircling an end of the respective conduit in said one member; a removable fluid-flow-permissive element disposed in said recess in contact with said annular shoulder; an unconnected removable ring member disposed in said recess, said ring member having an outer surface tapering with decreasing diameter in the direction of the aforesaid abutting face portions and being of lesser axial thickness than the depth of said recess; and an O-ring sealing member disposed in said recess in a squeezed condition between the aforesaid cylindrical surface, the outer tapered surface of said ring member, and the face portion of the other casing member.

References Cited by the Examiner

UNITED STATES PATENTS

| | | | |
|---|---|---|---|
| 672,598 | 4/01 | Drew | 277—187 X |
| 2,284,365 | 5/42 | Briegel | 285—340 |
| 2,458,817 | 1/49 | Wolfram | 277—170 X |
| 2,885,227 | 5/59 | Burger | 277—9 |

LEWIS J. LENNY, *Primary Examiner.*

EDWARD V. BENHAM, SAMUEL ROTHBERG,
*Examiners.*